United States Patent
Hironaka

[11] Patent Number: 6,155,068
[45] Date of Patent: Dec. 5, 2000

[54] AIR CONDITIONER

[75] Inventor: Yasumasa Hironaka, Daito, Japan

[73] Assignee: Funai Electric Co., Ltd., Osaka, Japan

[21] Appl. No.: 09/198,322

[22] Filed: Nov. 23, 1998

[30] Foreign Application Priority Data

Nov. 26, 1997 [JP] Japan .................. 9-324278

[51] Int. Cl.[7] ................................. F28G 23/00
[52] U.S. Cl. ............................. 62/303; 62/317
[58] Field of Search .............. 62/303, 317, 331, 62/78

[56] References Cited

U.S. PATENT DOCUMENTS

| | | | |
|---|---|---|---|
| 2,043,217 | 6/1936 | Yaglou | 62/78 |
| 2,825,102 | 3/1958 | Hicks et al. | 62/18 |
| 3,475,917 | 11/1969 | Schwing | 62/78 |
| 5,092,217 | 3/1992 | Murano et al. | 165/119 |

FOREIGN PATENT DOCUMENTS

| | | | |
|---|---|---|---|
| 61-268930 | 11/1986 | Japan | 62/78 |
| 63-61826 | 3/1988 | Japan | 62/78 |
| 63-123934 | 5/1988 | Japan | 62/78 |
| 5-203179 | 8/1993 | Japan | 62/78 |

*Primary Examiner*—William Doerrler
*Assistant Examiner*—Melvin Jones
*Attorney, Agent, or Firm*—Lackenbach Siegel

[57] ABSTRACT

An air conditioner includes a discharge electrode. The discharge electrode is arranged at a location spaced by a distance between the discharge electrode and a dust collecting electrode or greater. The discharge electrode also is positioned in a main stream of an air flow caused by a cross flow fan. The dust collecting electrode is provided at a location outside the main stream of the air flow and downstream of the discharge electrode relative to a direction of the air flow.

4 Claims, 5 Drawing Sheets

AIR CONDITIONER

BACKGROUND OF THE INVENTION

1. Field of the Invention

This invention relates to air conditioners and, more particularly, to an air conditioner which is adapted to collect fine particles (dusts) floating in air by giving electric charges to these dusts through corona discharge in order to collect charged dust particles onto a dust collecting electrode through the utilization of electrical forces.

2. Description of the Prior Art

A conventional air conditioner of this kind is disclosed as one example in Japanese Utility Model Laying-Open No. H3-119443 laid open on Dec. 10, 1991. As disclosed in this publication, conventionally a dust collecting unit (dust collecting electrode) for electrically collecting dusts contained in air has been arranged at a location between a filter provided closing a suction port to catch comparatively large-particle dusts and a heat exchanger for performing heat exchange on the air having passed through the filter.

In the prior art, the dust collecting unit is provided at a location close to the suction port (filter). There accordingly has been encountered by a problem that the dust collecting unit obstructs the flow of air to reduce the air flow rate at nearby the dust collecting unit, resulting in decrease in dust collectability. That is, conventionally the dust collecting unit has been arranged at a location with low air flow rate by giving no consideration to the air flow within the air conditioner (housing). Due to this, expected dust collectability is difficult to obtain. Also, there is a fear that the dusts once caught be scattered away by the air flow.

Meanwhile, the dust collecting electrode requires periodical cleaning together with the dismountably mounted filter. This results in a problem that time and labor are required for attaining dust collection with high efficiency. Furthermore, a space must be secured between the filter and the feet exchanger in order to place the dust collecting unit, causing a problem that the entire air conditioner is enlarged in size.

SUMMARY OF THE INVENTION

Therefore, it is a primary object of the present invention to provide an air conditioner which is excellent in dust collectability but small in size and less in maintenance time and labor.

This invention is an air conditioner, comprising: a housing having suction for taking air and discharge port for discharging the air taken through the suction port; a filter provided in association with the suction port to catch dusts contained in the air taken through the suction port; a heat exchanger for effecting heat exchange on the air having passed through the filter; a cross flow fan provided within the housing to create an air flow of from the suction port through the heat exchanger to the discharge port; and an electric dust collecting unit provided at a location behind the heat exchanger within the housing, and including a discharge electrode and a dust collecting electrode that are spaced by a certain distance from each other, wherein the discharge electrode is arranged at a location distant by a certain distance from the heat exchanger.

If the cross flow fan is rotated, an air flow of from the suction port through the heat exchanger to the discharge port is formed within the housing. The discharge electrode is provided at a location behind the heat exchanger and in a main stream of the air flow within the housing, while the dust collecting electrode is provided at a location outside the main stream and downstream of the discharge electrode in respect of an air flow direction. The dust collecting electrode is preferably positioned on an extension of a resultant vector of a vector of an air flow at around the discharge electrode and an electrical force (Coulomb's force) caused between the discharge electrode and the dust collecting electrode. The positively charged dusts undergo electrical forces due to a high electric field caused between the discharge electrode and the dust collecting electrode. These particles are moved to and caught by the dust collecting electrode. The dusts collected on the dust collecting electrode are heated up and dissolved by a heater provided inside the same electrode. Because the dust collecting electrode is positioned outside the main stream of the air flow, there is no fear that the dusts once caught on the dust collecting electrode be scattered away by the air flow. Moreover, the dust collecting electrode is appropriately cooled by the air flow and prevented from being increased in temperature.

Also, the gap dimension between the discharge electrode and the heat exchanger is determined greater than a gap dimension between the discharge electrode and the dust collecting electrode. This makes it possible to positively collect in-air dusts on the dust collecting electrode without generating corona discharge between the discharge electrode and the heat exchanger.

Furthermore, because the dust collecting electrode is located distant by a predetermined distance from the cross flow fan formed of a plastic resin or the like, the cross flow fan is protected against heat damage by the heater for self-cleaning of the dusts put on the dust collecting electrode.

According to the present invention, the discharge electrode is arranged at a location in a main stream of the air flow and distant by a given distance or greater from the heat exchanger, while the dust collecting electrode is arranged at a location outside the main stream and downstream of the discharge electrode. It is therefore possible to efficiently collect the dusts having charged by the discharge electrode.

Further, the heater is provided in the dust collecting electrode to burn and dissolve the dusts put on the dust collecting electrode, making maintenance (cleaning) for the dust collecting electrode unnecessary. The dust collecting unit can be arranged behind the heat exchanger within the housing, thereby reducing the size of the air conditioner. Further, the surrounding parts, such as the cross flow fan, does not suffer from thermal affection.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
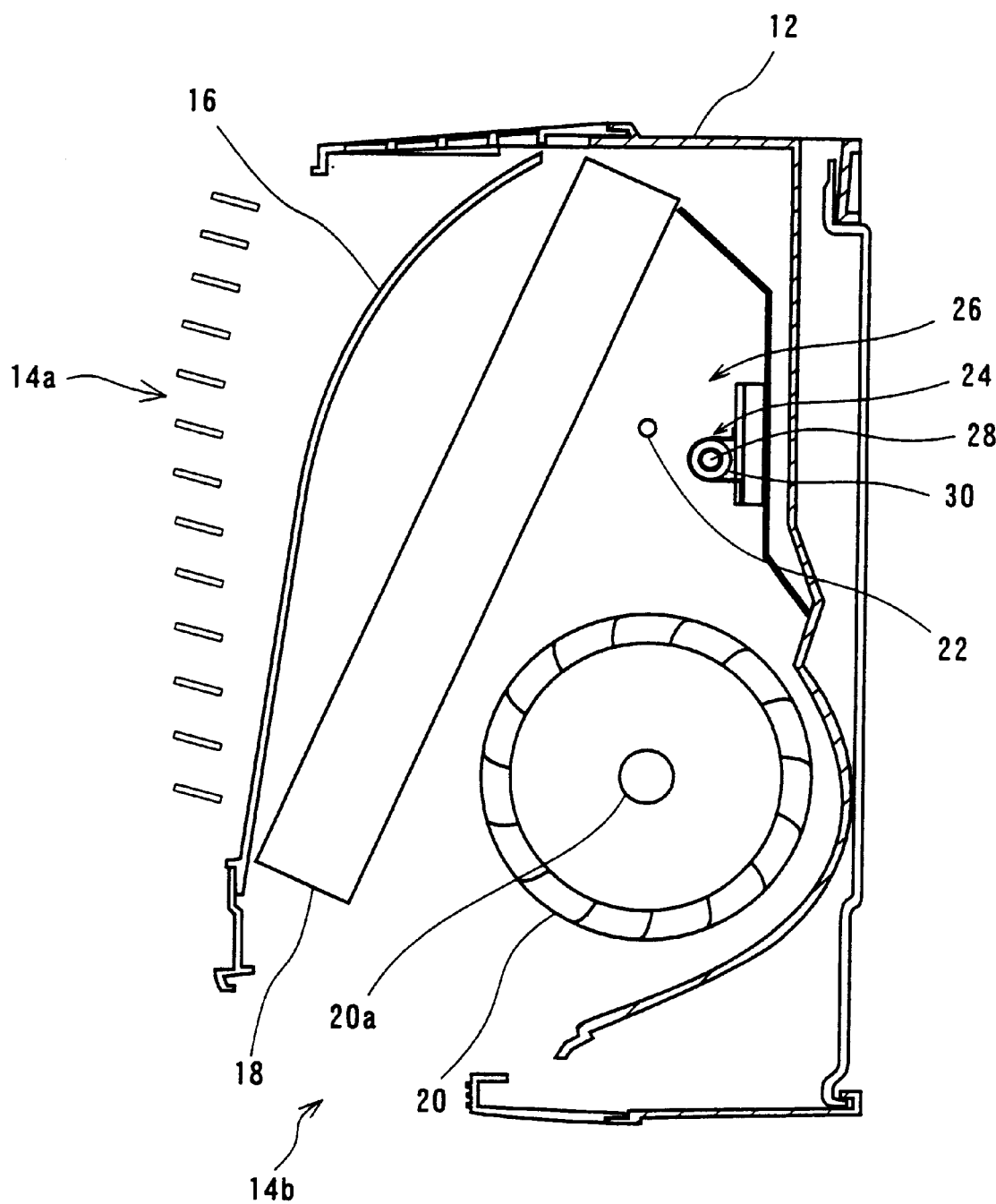
FIG. 1 is a sectional side view showing one embodiment of the present invention.

An air conditioner 10, as an embodiment shown in FIG. 1, includes a housing 12 formed of a synthetic resin, such as a plastic resin. This housing 12 has openings 14a and 14b formed at a front thereof. The opening 14a serves as a suction port, while the opening 14b located beneath the opening 14a serves as a discharge port. The openings 14a and 14b are hereinafter referred, respectively, to as suction port and discharge port.

A filter 16 is removably provided between the suction port 14a and the heat exchanger 18. The filter 16 is formed of a filter fiber, such as a glass or plastic fiber. The heat exchanger 18 is arranged behind the filter 16 so that heat exchange is made on the air taken to an inside of the housing 12 through the suction port 14a. A cross flow fan 20 is arranged at a location behind the heat exchanger 18 and deep inside the discharge port 14b. The rotation of the cross flow fan 20 creates an air flow extending, in a width direction (rotation axis 20a direction), from the suction port 14a through the heat exchanger 18 to the discharge port 14b.

An electric dust collecting unit 26 is provide at location hind the heat exchanger 18 within the housing 12, which includes a discharge electrode 22 and a dust collecting electrode spaced by a certain distance from each other. The discharge electrode 22 is formed by a steel wire, stainless wire, tungsten wire or the like, and laid extending in the width direction (direction of a rotation axis 20a) of the air conditioner 10. On the other hand, the dust collecting electrode 24 includes a rod-formed heater 28. This heater 28 is accommodated within a casing 30 that is generally in cylindrical form having ceramic layer encapsulating the heater 28 through the use of catalyst. The casing 30 (dust collecting electrode 24) at its surface is heated up to a temperature of 200° C.–350° C. by the heater 28 so that the dusts put on the surface are dissolve through oxidation into water or carbon dioxide. That is, the dust collecting electrode 24 in the FIG. 1 embodiment possesses a function of self-cleaning.

Figure 2:
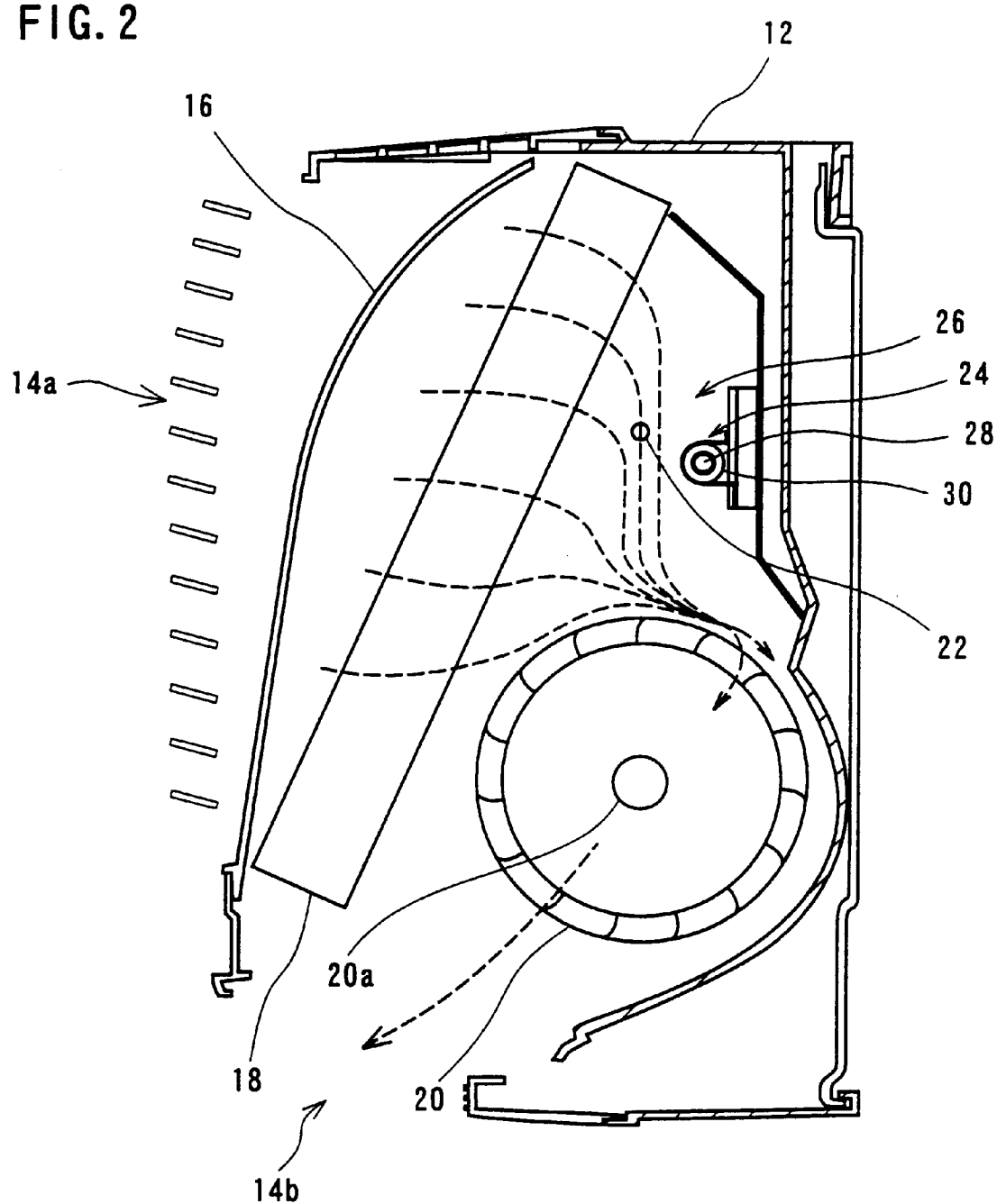
FIG. 2 is an illustrative view showing an air flow within an air conditioner of the FIG. 1 embodiment.
Figure 3:
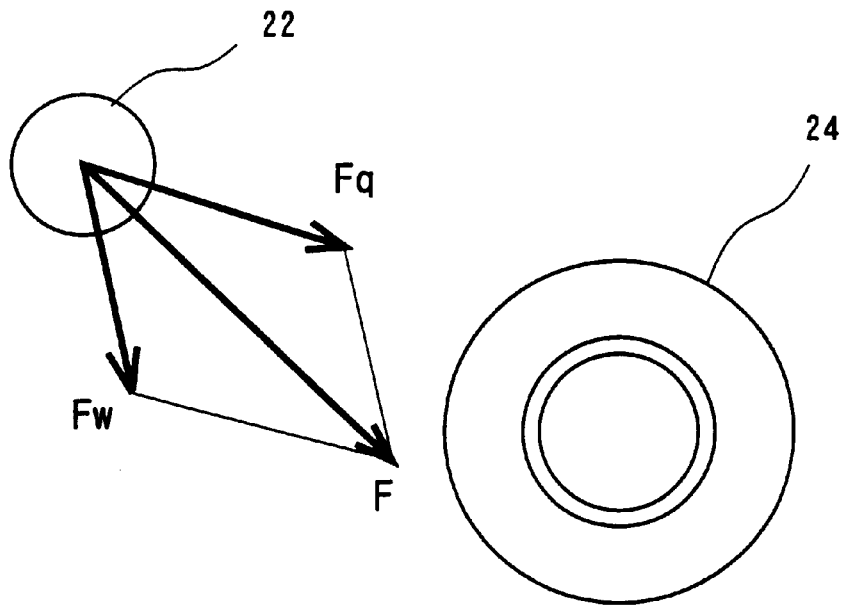
FIG. 3 is an explanatory view for explaining the principle of collecting dusts contained in air onto a dust collecting electrode.
Figure 4:
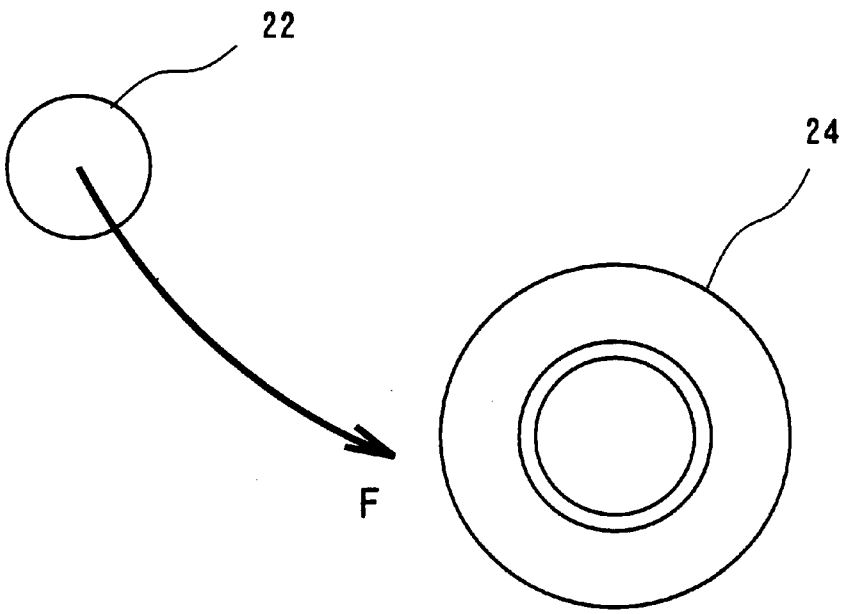
FIG. 4 is an illustrative view showing a state that the dusts in air are collected to the dust collecting electrode.
Figure 5:
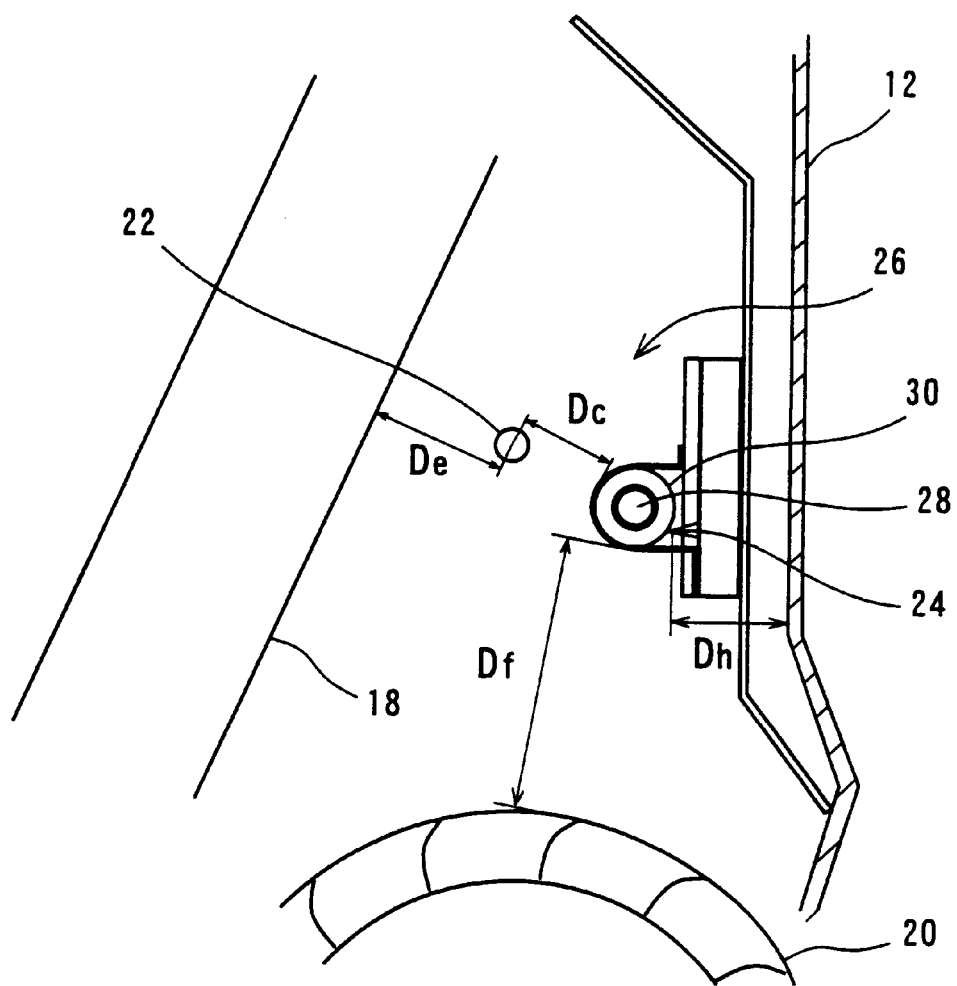
FIG. 5 is an essential-part magnifying view showing the discharge electrode in the FIG. 1 embodiment.

As will be understood from FIG. 2, the aforesaid discharge electrode 22 is arranged at a location that it lies in a main stream of the air after exchange of heat. On the other hand, the dust collecting electrode 24 is located at a point outside the main stream and downstream of the discharge electrode 22 with respect to a direction of air flow. In other words, the dust collecting electrode 24 is placed, as shown in FIG. 3, on an extension of a resultant vector (F) of a velocity vector (Fw) of the air flow at around the discharge electrode 22 and a Coulomb's force (Fq) caused between the discharge electrode 22 and the dust collecting electrode 24. Accordingly, the dust particles electrified by the discharge electrode are attracted to the dust collecting electrode 24 in a manner of depicting arcs, as shown in FIG. 4. The dust particles are continuously collected onto the dust collecting electrode 24 without scattering away by the air flow. These particles are dissolved by the heater 28.

Furthermore, in this embodiment the discharge electrode 22 and the dust collecting electrode 24 are arranged to fulfil a relationship that a gap dimension (De) defined between the discharge electrode 22 and the heat exchanger 18 is greater than a gap dimension (Dc) between the discharge electrode 22 and the dust collecting electrode 24. Due to this, the dust contained in the air is positively collected by the dust collecting electrode 24 while preventing corona discharge from occurring between the discharge electrode 22 and the heat exchanger 18. Furthermore, the dust collecting electrode 24 is provided at a location distant by predetermined distances (Dh, Df) from the synthetic-resin-formed housing 12 and cross flow fan 20 so that the housing 12 and the cross flow fan 20 undergo excessive thermal effects.

In the air conditioner 10 thus constructed, if the cross flow fan 20 is rotated and then a high voltage (e.g., 9 kV) is applied to between the discharge electrode 22 and the dust collecting electrode 24, comparatively large dusts is introduced together with air into a housing 12 through the suction port 14a and then caught by the filter 16 due to the rotation of the cross flow fan 20. The air, after passed through the filter, is then cooled down or heated up in the course of passing through the heat exchanger 18. The corona discharge being caused between discharge electrode 22 and the dust collecting electrode 24 produces positive ions on the discharge electrode 22. These positive ions travel along an electric force line to the dust collecting electrode 24. Due to this, the dusts in air after passed through the filter 16 and the heat exchanger 18 are charged with positive electricity by this electrode-to-electrode space. The charged particles undergo an electrical force (Coulomb's force) in high electric field between the electrodes and directed to the dust collecting electrode 24, thus being caught by the dust collecting electrode 24. The air, having been heat-exchanged and dust-cleaned, is discharged through the discharge port 14b to a room interior.

As stated above, the positions of the discharge electrode 22 and the dust collecting electrode 24 are determined by considering the air flow through the housing 12 and Coulomb's force acting between the discharge electrode 22 and the dust collecting electrode 24. It is therefore possible to efficiently electrifying the dusts to effectively catch the charged particles by the dust collecting electrode 24 through the utilization of a resultant force of air flow force and the electrical force (Coulomb's force). Furthermore, because the dust collecting electrode 24 is placed at a location outside a main stream of the air flow, so that the dust once caught will not scattered away by the air flow. Also, there exists an appropriate air flow around the dust collecting electrode 24, the dust collecting electrode 24 is prevented from being excessively heated up by the heater 28.

Further, because the discharge electrode 22 is positioned spaced by a certain distance from the heat exchanger 18, corona discharge can be positively caused between the discharge electrode 22 and the dust collecting electrode 24 to thereby catch the dusts by the dust collecting electrode 24. There is almost no fear that the peripheral members including the cross flow fan 20 formed of synthetic resin such as a plastic resin be thermally deformed by the heater 28.

Figure 6:
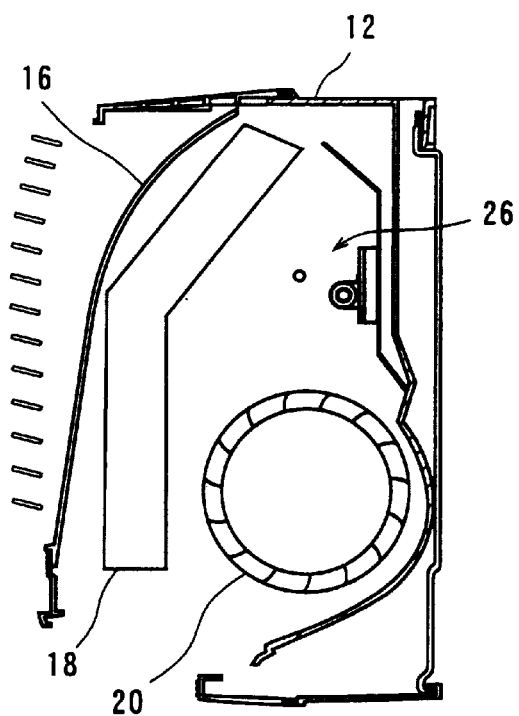
FIG. 6 is a sectional side view showing a modification to a heat exchanger.
Figure 7:
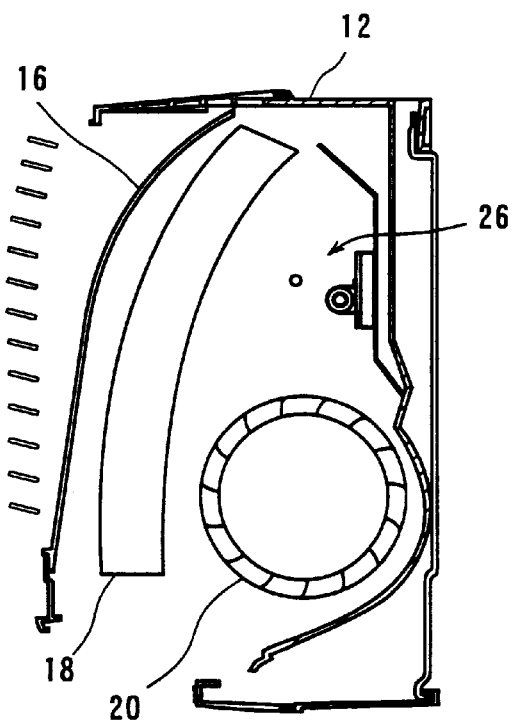
FIG. 7 is a sectional side view showing an another modification to the heat exchanger.

Incidentally, the housing 12, filter 16 and heat exchanger 18 are not limited in shape and attaching position to the above embodiment. It is needless to say that they can also be applied to an air conditioner using a heat exchanger 18 that is formed bent or curved as viewed from a side, as shown in FIG. 6 and FIG. 7.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An air conditioner, comprising:

a housing having suction for taking air and discharge port for discharging the air taken through said suction port;

a filter provided in association with said suction port to catch dusts contained in the air taken through said port;

a heat exchanger for effecting heat exchange on the air having passed through said filter;

a cross flow fan provided within said housing to create an air flow of from said suction port through said heat exchanger to said discharge port; and an electric dust collecting unit provided at a location behind said heat exchanger within said housing, and including a discharge electrode and a dust collecting electrode that are spaced by a certain distance from each other, wherein said discharge electrode is arranged at a location distant by a certain distance from said heat exchanger; and said dust collecting electrode has a heater for effecting self-cleaning of dust put on a surface thereof, said dust collecting electrode being positioned at a location so that no damage is given to at least said cross flow fan by said heater.

2. An air conditioner according to claim 1, wherein said discharge electrode is arranged in a main stream of the air flow, and said dust collecting electrode being arranged at a location outside the main stream and downstream of said discharge electrode in respect of a direction of an air flow.

3. An air conditioner according to claim 1, wherein said dust collecting electrode is arranged on an extension of a resultant vector of a vector of the air flow at around said discharge electrode and a Coulomb's force due to a background electric field caused between said discharge electrode and said dust collecting electrode.

4. An air conditioner according to claim 2, wherein said dust collecting electrode is arranged on an extension of a resultant vector of a vector of the air flow at around said discharge electrode and a Coulomb's force due to a background electric field caused between said discharge electrode and said dust collecting electrode.

* * * * *